United States Patent
Kitamura et al.

(10) Patent No.: US 7,045,910 B2
(45) Date of Patent: May 16, 2006

(54) BICYCLE POWER SUPPLY WITH REDUCED BATTERY LEAKAGE

(75) Inventors: Satoshi Kitamura, Kitakatsuragi-gun (JP); Haruyuki Takebayashi, Yao (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/708,892

(22) Filed: Mar. 30, 2004

(65) Prior Publication Data

US 2004/0195839 A1   Oct. 7, 2004

(30) Foreign Application Priority Data

Apr. 1, 2003   (JP) ............... 2003-097860

(51) Int. Cl.
*F02B 63/04*   (2006.01)
(52) U.S. Cl. ............. 290/1 C; 290/1 R; 290/44; 290/50
(58) Field of Classification Search ........... 290/1 C, 290/44 C, 1 R, 50, 5 O
See application file for complete search history.

(56) References Cited

U.S. PATENT DOCUMENTS

| | | | | |
|---|---|---|---|---|
| 4,860,176 A | * | 8/1989 | Bauwens | ............ 362/72 |
| 6,034,492 A | * | 3/2000 | Saito et al. | ............ 318/141 |
| 6,555,928 B1 | * | 4/2003 | Mizuno | ............ 290/40 |
| 6,573,686 B1 | | 6/2003 | Uno | |
| 2003/0001357 A1 | | 1/2003 | Fujii et al. | |

FOREIGN PATENT DOCUMENTS

| | | |
|---|---|---|
| JP | 5-77774 A | 3/1993 |
| JP | 6-32187 U | 4/1994 |
| JP | 2001-130314 A | 5/2001 |
| JP | 2004-42871 A | 2/2004 |

* cited by examiner

*Primary Examiner*—Darren Schuberg
*Assistant Examiner*—Iraj A. Mohandesi
(74) *Attorney, Agent, or Firm*—James A. Deland

(57) ABSTRACT

A bicycle power supply apparatus comprises a battery unit for storing power from a power supply and for supplying power to electrical components; a power switch operatively coupled to the battery unit for selectively switching power from the battery unit to the electrical components; and a switch control unit that receives power from the power supply and controls the power switch according to the power received from the power supply.

14 Claims, 7 Drawing Sheets

BICYCLE POWER SUPPLY WITH REDUCED BATTERY LEAKAGE

BACKGROUND OF INVENTION

The present invention is directed to bicycles and, more particularly, to a bicycle power supply with reduced battery leakage.

Some recent bicycles have been equipped with electronically controllable electrical components such as derailleurs, suspension devices, displays, etc., along with the electrical controllers for such components. A well-known example of this technology is an automatic bicycle transmission that uses a speed sensor to automatically change gears according to bicycle speed. In all cases, a power supply is required to supply electricity to the various electronic components. Sometimes batteries are used for such power supplies. However, batteries need to be replaced when their electricity is consumed, and such replacement places undesirable burdens on the rider. Furthermore, the electrical components may suddenly stop operating when the batteries are depleted, which can be very problematic.

To avoid the above problems, some systems use a rechargeable battery as the power supply, wherein the rechargeable battery may be recharged using an alternating current generator mounted to the bicycle. Such a system is shown in JP 2001-245475. In this system, a rectifier converts current from an alternating current generator to direct current, and the direct current is used to charge a capacitor that functions as a battery unit. The capacitor typically comprises an electrolytic or double layer capacitor with a relatively large power storing capacity. Power from the capacitor then may be used to operate the various electrical components mounted on the bicycle.

In these systems, the microcomputers used to operate the various components typically include power conservation modes (e.g., SLEEP, HALT and STOP modes, etc.) in order to reduce electrical consumption during periods when the bicycle is parked, thereby prolonging the battery charge. However, even when operating in such modes, the microcomputer still consumes small amounts of electricity, and some electrical current leaks from the various electrical components connected to the microcomputer. This reduces the effectiveness of the power conservation modes and hence reduces the charge life of the battery.

SUMMARY OF INVENTION

The present invention is directed to various features of a bicycle power supply. In one embodiment, a bicycle power supply apparatus comprises a battery unit for storing power from a power supply and for supplying power to electrical components; a power switch operatively coupled to the battery unit for selectively switching power from the battery unit to the electrical components; and a switch control unit that receives power from the power supply and controls the power switch according to the power received from the power supply. Additional inventive features will become apparent from the description below, and such features alone or in combination with the above features may form the basis of further inventions as recited in the claims and their equivalents.

DETAILED DESCRIPTION

Figure 1:
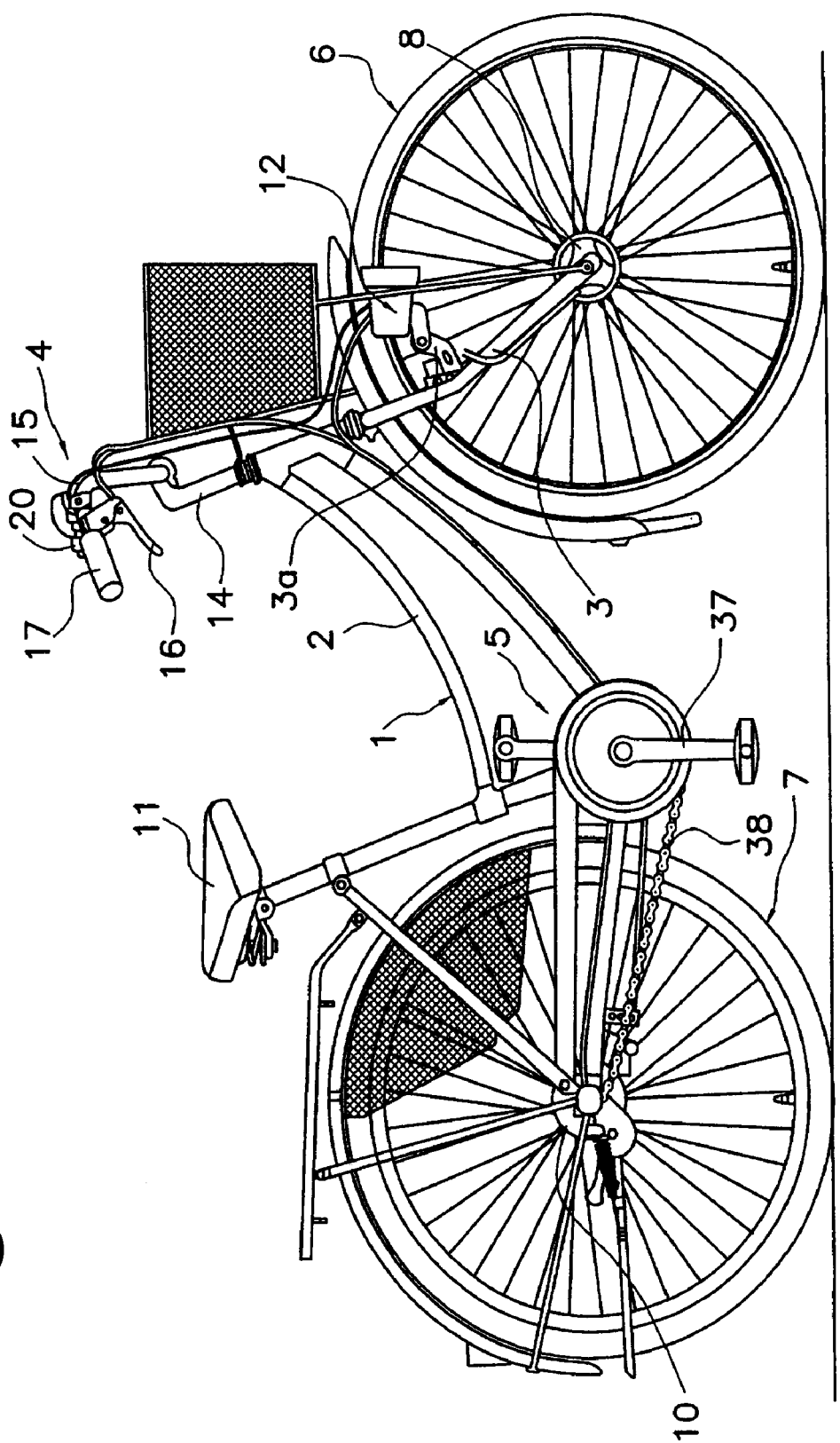
FIG. 1 is a side view of a bicycle that includes a particular embodiment of a power supply.

FIG. 1 is a side view of a bicycle 1 that includes a particular embodiment of a power supply. Bicycle 1 is a light roadster recreational bicycle comprising a double-loop frame body 2 formed from welded tubes, a front fork 3 mounted to the frame body 2 for rotation around an inclined axis, a handlebar assembly 4, a drive component 5, a front wheel 6 on which an alternating current generating dynamo hub 8 with brakes is mounted, a rear wheel 7 on which an internal shifting hub 10 is mounted, a saddle 11, a shift control unit 12 to control shifting of the internal shifting hub 10, and a shift controller 20 for manually operating the shift control unit 12.

Figure 2:
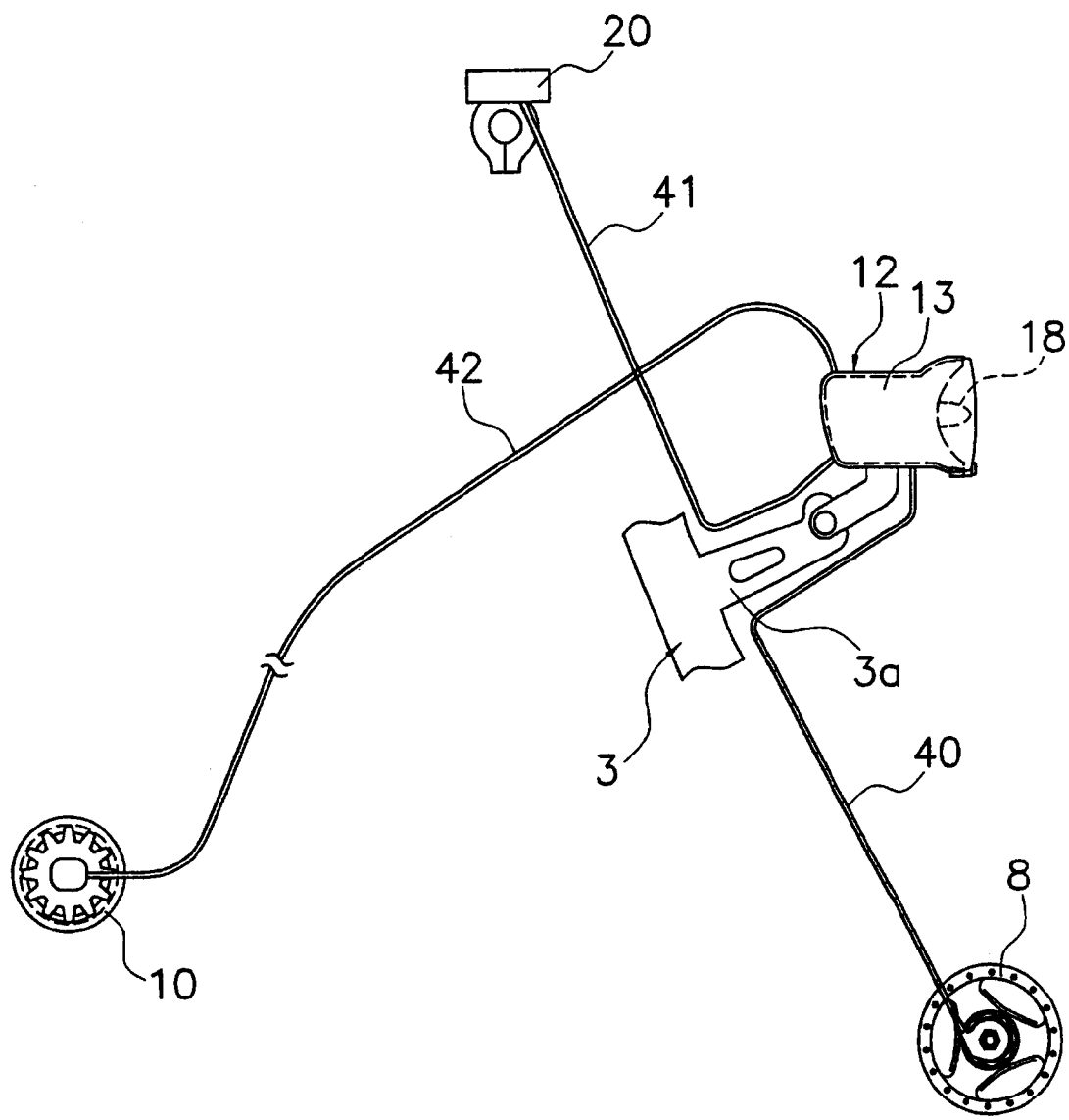
FIG. 2 illustrates how a shift controller, a shift control unit, an alternating current generator and a transmission are coupled together.

The handlebar assembly 4 comprises a handle stem 14, fastened to the upper part of the front fork 3, and a handlebar 15 fastened to the handle stem 14. Brake levers 16 and grips 17 are mounted on both ends of the handlebar 15. In this embodiment, the shift controller 20 is integrated with the right-side brake lever 16. The drive component 5 comprises a crank 37, mounted on the lower part (bottom bracket component) of the frame body 2, and a chain 38 that engages the crank 37 and the internal shifting hub 10. The internal shifting hub 10 is capable of producing three speed steps, including a low speed step (speed 1), an intermediate speed step (speed 2), and a high speed step (speed 3). These three speed steps can be selected by means of a motor unit 29 (FIG. 3) in the shift control unit 12. The dynamo hub 8 of the front wheel 6 can be fitted with a roller-type front brake, and it houses an alternating current generating dynamo (D) 19 (FIG. 6) that generates electricity in response to the rotation of the front wheel 6. As shown in FIG. 2, the shift control unit 12 is electrically connected to the alternating current generating dynamo 19 housed in the dynamo hub 8 by electrical wiring 40, and it is electrically connected to the shift controller 20 by electrical wiring 41. The shift control unit 12 is mechanically connected to the internal shifting hub 10 by a shift control cable 42.

Figure 3:
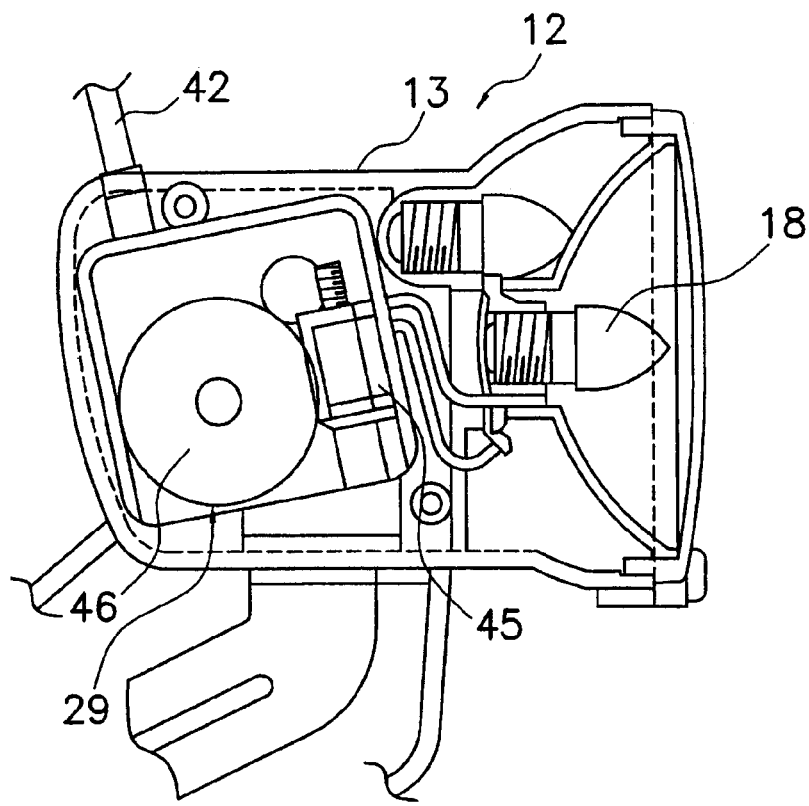
FIG. 3 is a side cross sectional view of the shift control unit shown in FIG. 2.
Figure 4:
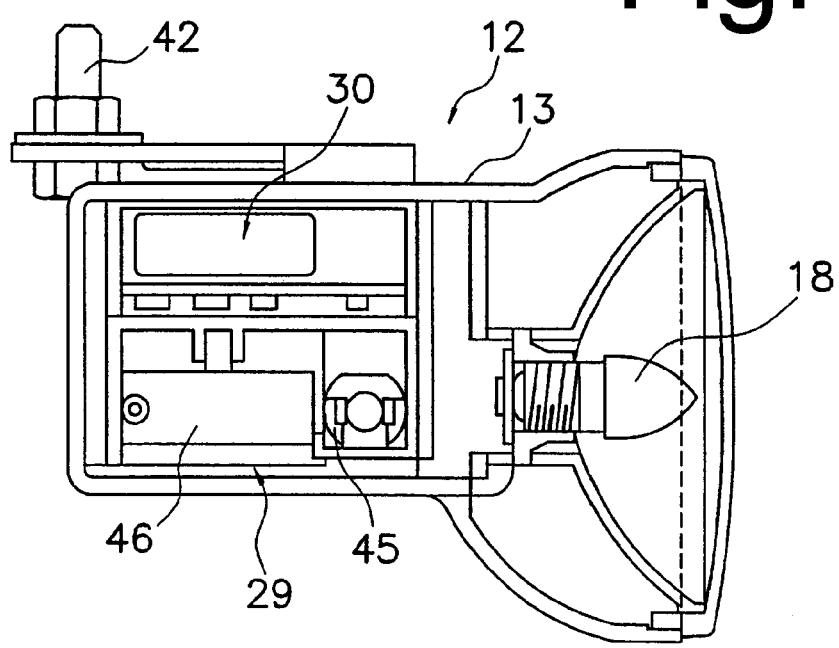
FIG. 4 is a top cross sectional view of the shift control unit shown in FIG. 2.

As shown in FIGS. 3 and 4, the shift control unit 12 comprises a headlight case 13 mounted to a headlight stay 3a located midway along the front fork 3 for housing a headlight 18. The motor unit 29 and a circuit unit 30 are housed in the headlight case 13. The motor unit 29 comprises an electric shifting motor 45, a cable operating component 46 which moves into three shifting positions by means of the shifting motor 45, and a position sensor 47 (FIG. 6) to detect the shift position of the cable operating component 46. One end of the shift control cable 42 is connected to this cable operating component 46. The circuit unit 30 comprises a control unit 25 (FIG. 6) containing a microcomputer comprising a CPU, RAM, ROM, and an I/O interface.

Figure 5:
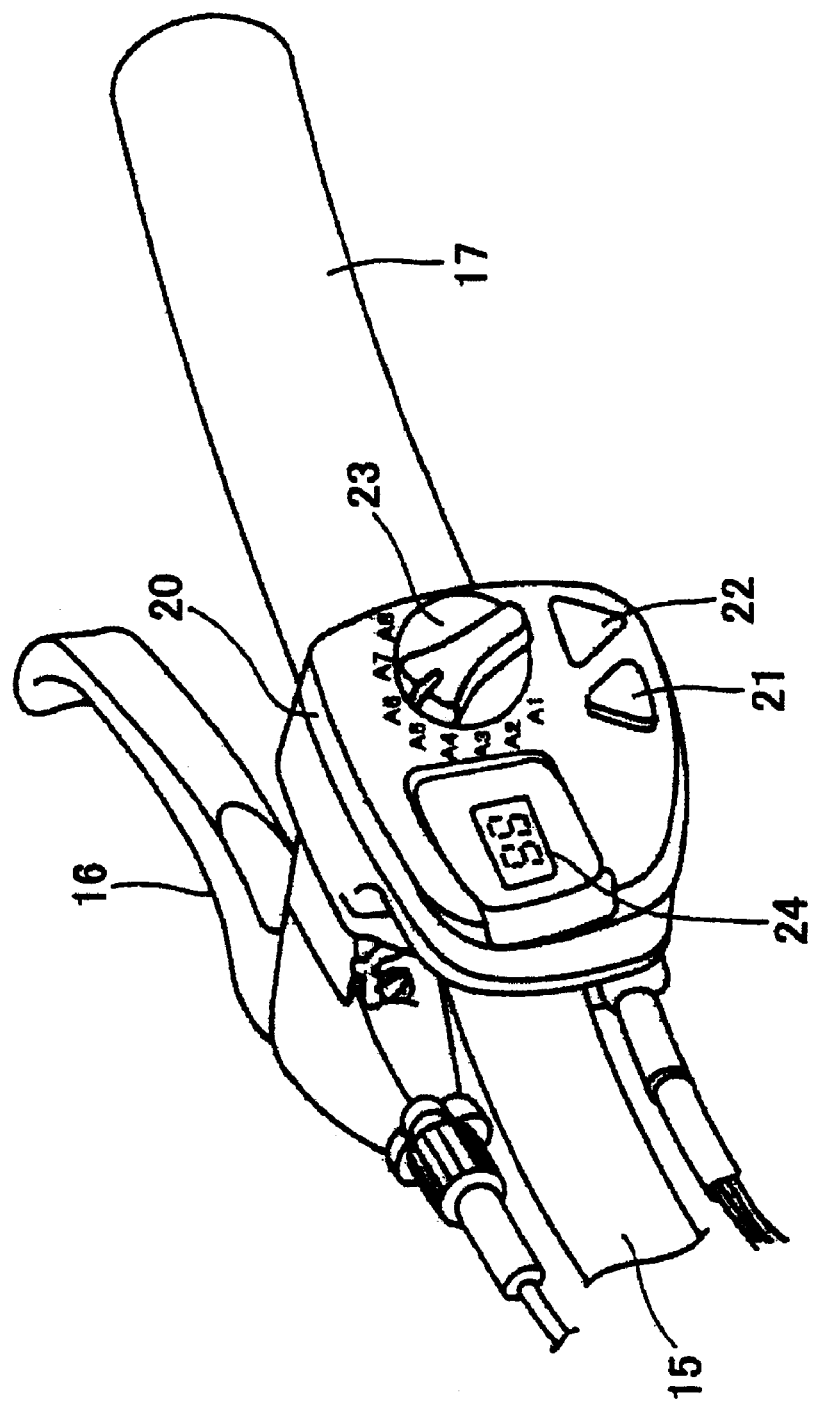
FIG. 5 is a perspective view of the shift controller.

As shown in FIG. 5, the shift controller 20 comprises two operating buttons 21 and 22 in the form of triangular pushbuttons disposed next to each other, an operating dial 23 disposed above the operating buttons 21 and 22, and a liquid crystal display device 24 disposed to the left of the operating dial 23 for displaying information such as current gear and speed. The operating button 21 on the left side may be used for manually shifting from the low speed step to the intermediate speed step and to the high speed step. The operating button 22 on the right side may be used for manually shifting from the high speed step to the intermediate speed step and to the low speed step. Operating buttons 21 and 22 also may be used to set limits on the gears that may be used. For example, the system may be set such that only the low and intermediate speeds may be used, only the intermediate and high speed ranges may be used, only the low speed range may be used, and so on. The operating dial 23 is used for switching between eight automatic shifting modes (A1–A8), using eight detent positions. The eight automatic shifting modes (A1–A8) are modes for automatically shifting the internal shifting hub 10 according to a bicycle speed signal derived from the alternating current generating dynamo 19. The eight automatic shifting modes (A1–A8) are designed to allow shift timing (i.e., the threshold speed values at which shifting will occur) to be automatically changed during upshifting (shifting from low speed to high speed) or downshifting (shifting from high speed to low speed) to accommodate rider preference and physical capability.

Figure 6:
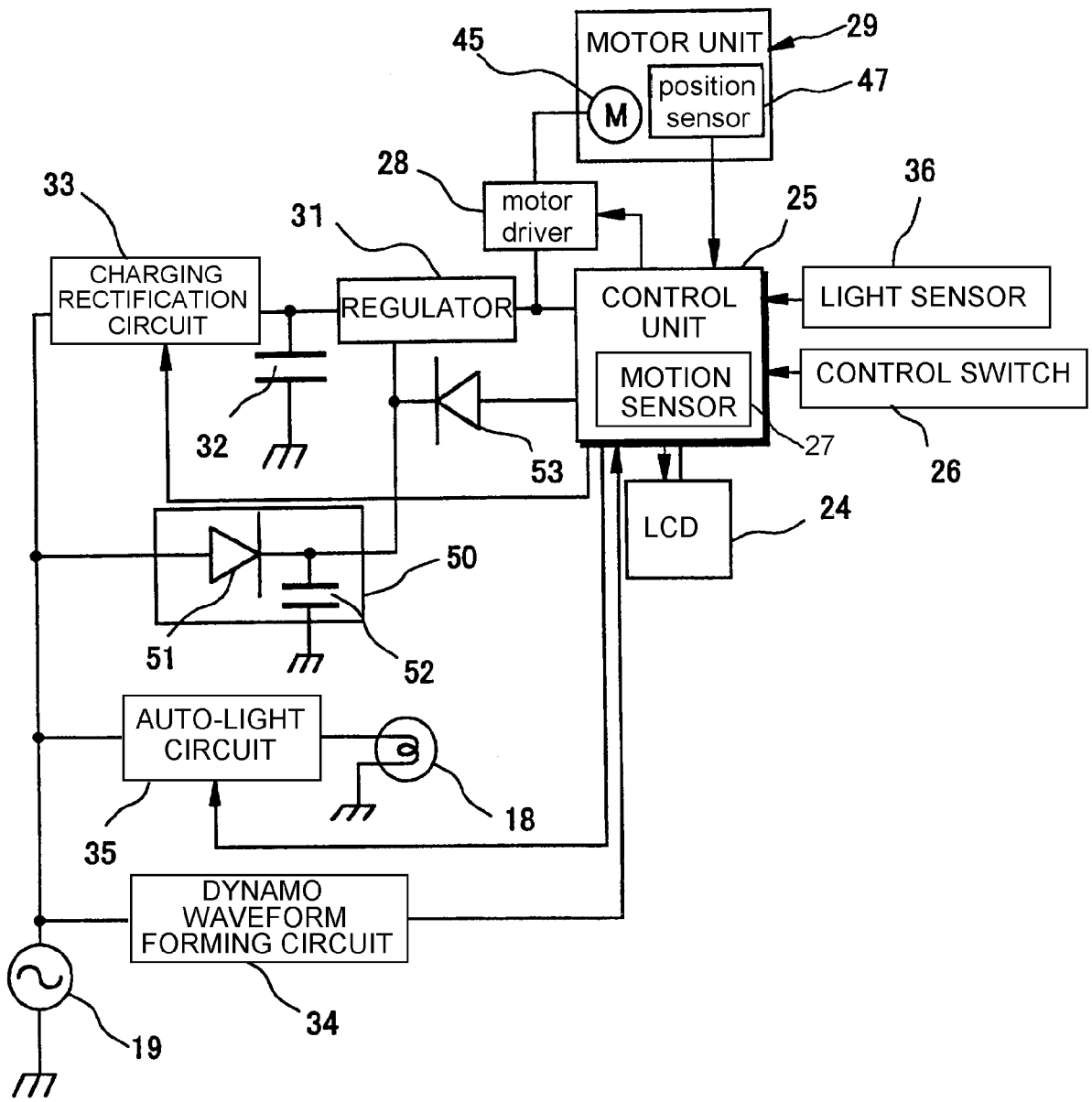
FIG. 6 is a schematic block diagram of the overall bicycle control system.

FIG. 6 is a block diagram illustrating the structure of the overall bicycle control system. Control unit 25 is operatively coupled to a control switch 26 (which schematically represents the operating dial 23 and operating buttons 21 and 22 in the shift controller 20); to the liquid crystal display device 24; to a dynamo waveform forming circuit 34 that generates a speed signal derived from the output of the alternating current generating dynamo 19; to a charging rectification circuit 33; to a power storage element or battery unit 32 (e.g., a capacitor) through a power switch such as a voltage regulator 31; to a light sensor 36 (illumination sensor); to an auto light circuit 35 for controlling the operation of headlight 18; to a motor driver 28; to the position sensor 47 of the motor unit 29; and to a switch control unit 50.

Control unit 25 is a programmed unit that automatically controls shifting of internal shifting hub 10 via motor driver 28 according to travel speed. Motor driver 28 operates from current supplied by battery unit 32, and it controls the current supplied by the battery unit 32 to operate shifting motor 45. A separate control unit (not shown) uses information sent from control unit 25 to control liquid crystal display device 24 disposed in the shift controller 20. The control unit 25 also controls the headlight 18 by turning it on when surrounding light conditions fall below a certain prescribed brightness, and by turning it off when surrounding light conditions are above the prescribed brightness. In this embodiment, control unit 25 operates in either a normal mode or a power conservation mode. In power conservation mode, neither the liquid crystal display device 24 nor motor unit 29 is operated.

Charging rectification circuit 33 comprises, for example, a half-wave rectifier circuit that rectifies an alternating current output from the alternating current generating dynamo 19 to a direct current (for example) and supplies the direct current to battery unit 32. Battery unit 32 may comprise, for example, a high-capacity capacitor (e.g., an electric double layer capacitor) that stores the direct current that is output from charging rectification circuit 33. One terminal of battery unit 32 is coupled between charging rectification circuit 33 and regulator 31, and the other terminal of battery unit 32 is coupled to a ground potential. The battery unit 32 also may comprise other capacitors, such as an electrolytic capacitor, or secondary batteries such as nickel cadmium batteries, lithium ion batteries, nickel-metal hydride batteries, etc., in lieu of a capacitor.

Battery replacement and recharging are unnecessary because battery unit 32 stores electrical power from the alternating current generating dynamo 19, and components such as the control unit 25, motor driver 28 and motor unit 29 are operated using this electrical power. Monitoring remaining battery power and carrying along spare batteries also become unnecessary, and shifting can be done automatically without performing the cumbersome procedures required by conventional power sources. The electrical power from the alternating current generating dynamo 19, which conventionally is not employed in the daytime, can be put to effective use in the shift control unit 12.

Regulator 31 is coupled between battery unit 32 and charging rectification circuit 33 on one side and control unit 25 and motor driver 28 on the other side. Regulator 31 may comprise switching elements such as field effect transistors (FET's), etc. to selectively disconnect battery unit 32 from control unit 25 and motor driver 28 when the bicycle is in a parked condition or when control unit 25 otherwise operates in power conservation mode. More specifically, regulator 31 is turned on when signals higher than a predetermined voltage level are input, and regulator 31 is turned off when signals lower than the predetermined voltage level of voltage are input. In this embodiment, regulator 31 is turned on and off by means of signals sent from switch control unit 50 (which functions as a first switch control unit), as well as by signals sent from control unit 25 (which functions as a second switch control unit). As a result, battery voltage may be preserved even more reliably when control unit 25 operates in power conservation mode as discussed in more detail below.

Switch control unit 50 comprises a diode 51 and a capacitor 52, wherein the anode of diode 51 is coupled to alternating current generating dynamo 19 prior to charge rectification circuit 33, and the cathode of diode 51 is coupled to a first terminal of capacitor 52. Thus, diode 51 is connected to alternating current generating dynamo 19 parallel with charging rectification circuit 33. Diode 51 performs half-wave rectification of the signals from alternating current generating dynamo 19 to supply direct current to capacitor 52. A second terminal of capacitor 52 is coupled to a ground potential. Capacitor 52 may comprise an electrolytic capacitor that smoothes the output from diode 51. The first terminal of capacitor 52 is connected to regulator 31 and supplies a voltage signal to regulator 31 based on the amount of direct current received from diode 51. This voltage signal turns regulator 31 on and off depending on the voltage value.

Control unit 25 also is coupled to regulator 31 for turning regulator 31 on and off. A diode 53 is coupled on the signal line between control unit 25 on one side and regulator 31 and capacitor 52 of switch control unit 50 on the other side to prevent reverse current flow between these components.

As a result of the foregoing structures, switch control unit 50 turns regulator 31 on and off using electricity directly supplied from alternating current generating dynamo 19. Thus, when the bicycle is running, the voltage of capacitor 52 rises sufficiently to turn on regulator 31, and when the bicycle is stopped, the voltage of capacitor 52 falls until it turns off regulator 31. On the other hand, control unit 25 can turn regulator 31 on and off separately from switch control unit 50. For example, when the bicycle is stopped only for a short period of time due to traffic signals or for some other reason, or when the running speed decreases, control unit 25 may provide a signal to keep regulator 31 turned on even when the voltage of capacitor 52 falls below the turn off voltage of regulator 31. Conversely, control unit 25 may provide a signal to turn off regulator 31 even when regulator 31 ordinarily would be switched on by capacitor 52.

The dynamo waveform forming circuit 34 forms a speed signal from the alternating current output from the alternating current generating dynamo 19. More specifically, a half-cycle is extracted from a sine wave alternating current signal, passed through a Schmitt circuit or other appropriate waveform forming circuit, and formed into a pulse signal corresponding to speed. Control unit 25 uses this signal to calculate speed and distance and to control the automatic shifting of the internal shifting hub 10 without requiring a separate speed sensor. Control unit 25 also uses this signal to determine whether the bicycle is in a stopped condition for a predetermined time interval (e.g., 15 minutes) using a motion sensor 27, which pay be a program running within control unit 25.

The auto light circuit 35 supplies or interrupts, for example, a 1A current output from the alternating current generating dynamo 19 to the headlight 18 in response to on/off signal output from the control unit 25. Control unit 25 generates these signal based on the signals from the light sensor 36 in such a manner that the headlight 18 is switched on automatically when light levels fall below a prescribed limit, and it is switched off when light levels exceed the prescribed limit. In this embodiment, headlight 18 is operated from the alternating current generating dynamo 19 so that the current draw is less apt to adversely affect the battery unit 32, but this is not necessary.

Bicycle speed is detected based on the alternating current signal output from the alternating current generating dynamo 19, and shifting is controlled according to the detected bicycle speed and the selected shifting mode. Because alternating current generating dynamos generally have a plurality of circumferentially disposed magnetic poles, the alternating current generating dynamo 19 outputs an alternating current signal with a frequency related to the bicycle speed and the number of magnetic poles. Consequently, it is possible to obtain a larger number of signal pulses from the alternating current signal during each wheel rotation in comparison with a speed signal obtainable, for example, from a conventional speed sensor that detects a magnet mounted to the bicycle wheel. Therefore, the bicycle speed can be accurately detected within the space of one wheel rotation, and shifting can be controlled in real time with high precision. Furthermore, since shifting is controlled based on the alternating current signal from the alternating current generating dynamo 19, it is no longer necessary to dispose the shift control unit 12 in the vicinity of the bicycle wheel. No limitation is placed on the mounting position of the shift control unit 12.

Figure 7:
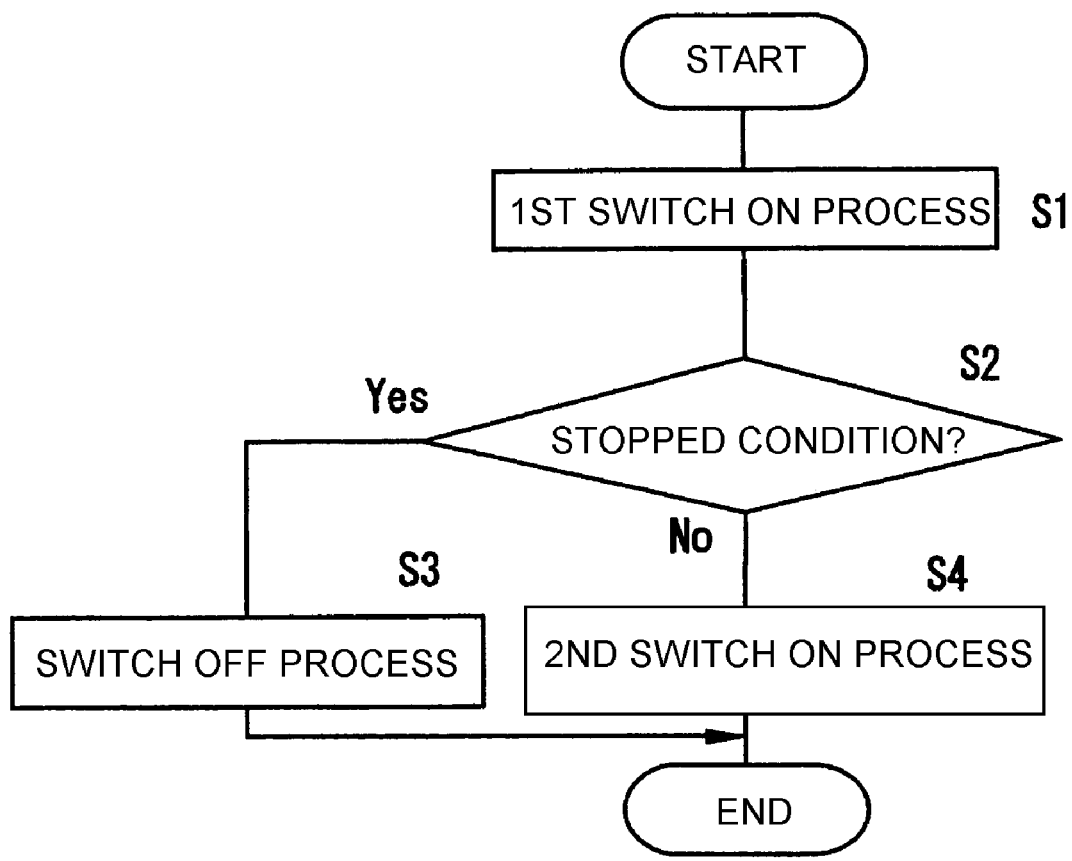
FIG. 7 is a flowchart of a particular embodiment of an electrical supply routine.

The overall switching operation may be understood by referring to the flow chart shown in FIG. 7. When the bicycle is running, battery unit 32 is charged and switch control unit 50 provides a signal for turning on regulator 31 in Step S1 using electricity received from alternating current generating dynamo 19 and stored in capacitor 52. Control unit 25 then determines in Step S2 using motion sensor 27 whether or not the bicycle is in a stopped condition for a predetermined period of time. If so, then control unit 25 provides a signal for turning off regulator 31 in Step S3. Otherwise, control unit 25 provides a signal for turning on regulator 31 in Step S4.

Figure 8:
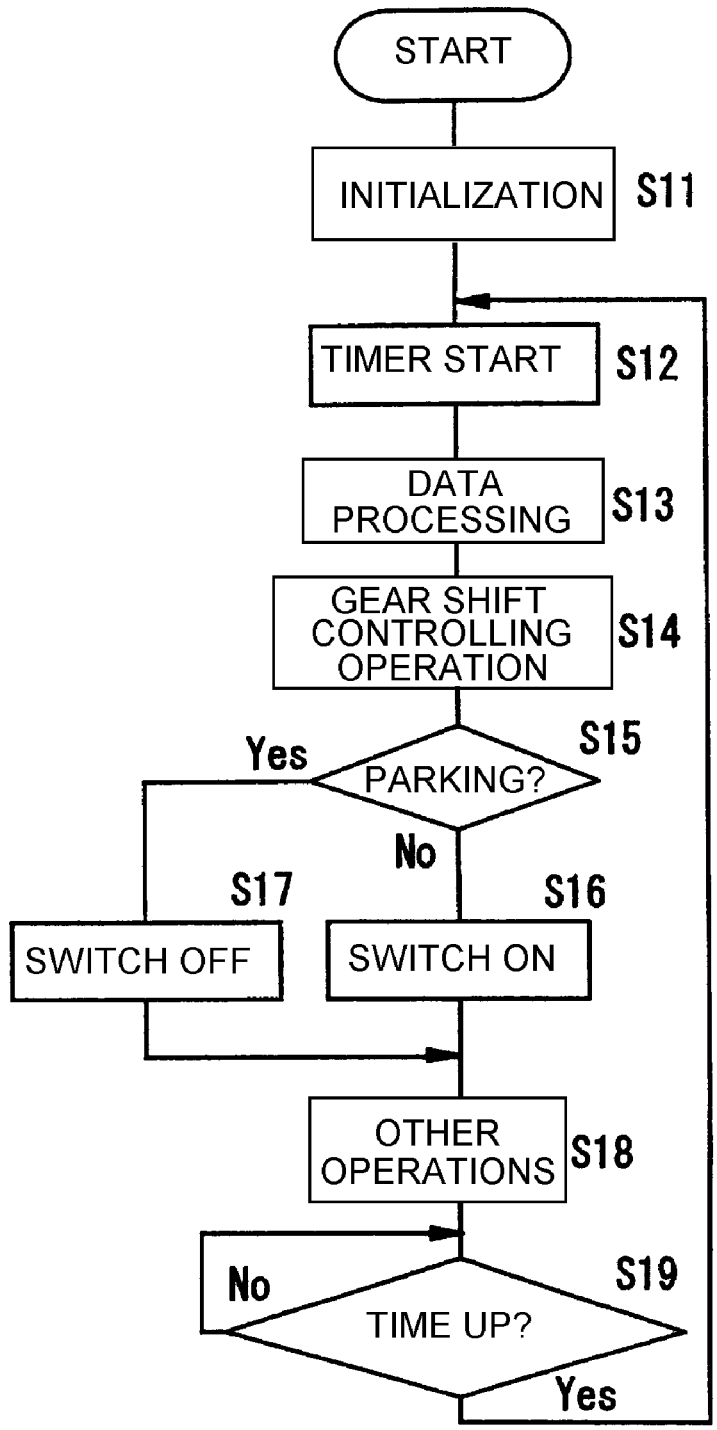
FIG. 8 is flow chart of a particular embodiment of a main routine for the control unit.

More detailed operation of control unit 25 may be understood from the flow chart shown in FIG. 8. When the bicycle begins running, battery unit 32 is charged from the signals received from alternating current generating dynamo 19 through charging rectification circuit 33. When the voltage of battery unit 32 reaches a predetermined level, control unit 25 begins operation and performs an initialization operation in Step S11. For example, the system may be set to a normal mode of operation, and the shift mode may be set as selected by operating dial 23.

In Step S12, a timer that determines the per-cycle operation time of the microcomputer is started. In Step S13, various types of data processing are conducted. Such data processing may include the calculation of speed, distance, etc., based on the pulse signals received from dynamo waveform forming circuit 34. In Step S14, a gear shift controlling operation is performed. In this operation, control unit 25 automatically controls motor 45 in motor unit 29, to place internal shifting hub 10 in the appropriate gear, based on bicycle speed. Alternatively, internal shifting hub 10 may be commanded to upshift or downshift to an appropriate gear by pressing operating buttons 21 and 22.

In Step S15, control unit 25 determines whether or not the bicycle is in a parked condition. In this embodiment, the bicycle is considered to be in a parked condition when pulse signals are not received from dynamo waveform forming circuit 34 for more than a predetermined time interval, such as 15 minutes. If the bicycle is not in a parked condition, then control unit 25 provides a signal (e.g., a signal greater than 3 Volts) for turning on regulator 31 in Step S16, even if switch control unit 50 provides a signal that ordinarily would turn off regulator 31 at this time. On the other hand, if control unit 25 determines that the bicycle is in a parked condition, then control unit 25 provides a signal (e.g., a signal less than 3 Volts) for turning off regulator 31 in Step 17. This, in turn, disconnects power to control unit 25 and motor driver 28, thus greatly minimizing power loss from battery unit. Control unit 25 then resets and stops operating. Since 15 minutes elapses before system shutoff, control unit 25 may access memory and complete other operations safely before reset. Also, control unit 25 may allow for shutoff before the voltage in battery unit 32 drops to an unreliable level. This also provides for more reliable startup when the bicycle resumes running.

In any event, other operations are performed in Step S18 (after power resumes, if necessary). Such operations may include displaying selected information on liquid crystal display 24, controlling the operation of the lamp 18, and controlling the operation of charging rectification circuit 33. In Step S19, the timer started in Step S12 awaits the end of the processing cycle, whereupon the process returns to Step S2.

While the above is a description of various embodiments of the present invention, further modifications may be employed without departing from the spirit and scope of the present invention. For example, while alternating current generating dynamo 19 was used as the power supply that charged battery unit 32 in the above embodiment, the teachings herein also may be applied to devices that uses direct voltage sources such as batteries and direct current generators.

In the above described embodiment, regulator 31 is turned off during times when the bicycle is parked, which is considered a stopped condition of more than a predetermined amount of time. However, regulator 31 can be turned off based on other criteria and/or during stopped condition times other than for parking.

In the above described embodiment, regulator 31 is turned off during parking conditions by means of control unit 25. However, regulator 31 could be turned on and off to accommodate such conditions by means of switch control unit 50. In this case, capacitor 52 could be structured in such a way that it has sufficient capacity to maintain regulator 31 turned on for 5 to 15 minutes after alternating current generating dynamo 19 stops generating electricity. In this case, the timing for turning on regulator 31 might also be delayed while capacitor 52 subsequently charges up, but the structure is simplified.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

The invention claimed is:

1. A bicycle power supply apparatus comprising:
   a battery unit for storing power from a power supply and for supplying power to electrical components;
   a power switch operatively coupled to the battery unit for selectively switching power from the battery unit to the electrical components powered by the battery unit to operate the electrical components; and
   a first switch control unit that receives power from the power supply and controls the power switch to switch power from the battery unit to the electrical components powered by the battery unit to operate the electrical components, wherein the first switch control unit is controlled by a selected amount of power received from the power supply.

2. The apparatus according to claim 1 wherein the first switch control unit is structured to receive power from the power supply in parallel with the battery unit.

3. The apparatus according to claim 1 wherein the battery unit is structured to receive power from an alternating current generator.

4. The apparatus according to claim 3 further comprising a first rectifier coupled to the battery unit that converts alternating current received from the alternating current generator to direct current that is stored in the battery unit.

5. A bicycle power supply apparatus comprising:
   a battery unit for storing power from a power supply and for supplying power to electrical components, wherein the battery unit is structured to receive power from an alternating current generator;
   a first rectifier coupled to the battery unit that converts alternating current received from the alternating current generator to direct current that is stored in the battery unit;
   a power switch operatively coupled to the battery unit for selectively switching power from the battery unit to the electrical components;
   a first switch control unit that receives power from the power supply and controls the power switch according to the power received from the power supply;
   wherein the first switch control unit comprises:
   a capacitance; and
   a second rectifier that converts alternating current received from the alternating current generator to direct current that is stored in the capacitance.

6. The apparatus according to claim 5 wherein the first switch control unit provides a signal to turn on the power switch when a voltage of the capacitance is above a predetermined level.

7. A bicycle power supply apparatus comprising:
   a battery unit for storing power from a power supply and for supplying power to electrical components;
   a power switch operatively coupled to the battery unit for selectively switching power from the battery unit to the electrical components; and
   a first switch control unit that receives power from the power supply and controls the power switch according to the power received from the power supply;
   a motion sensor; and
   a second switch control unit that controls the power switch in response to signals from the motion sensor.

8. The apparatus according to claim 7 wherein the second switch control unit provides a signal to turn on the power switch when the motion sensor senses motion.

9. The apparatus according to claim 7 wherein the second switch control unit provides a signal to turn off the power switch when the motion sensor does not sense motion.

10. The apparatus according to claim 9 wherein the second switch control unit provides a signal to turn off the power switch only when the motion sensor does not sense motion for a predetermined time interval.

11. The apparatus according to claim 7 wherein the motion sensor senses motion based on signals from an alternating current generator.

12. The apparatus according to claim 11 wherein the second switch control unit provides a signal to turn off the power switch only when the motion sensor does not sense signals from the alternating current generator for a predetermined time interval.

13. The apparatus according to claim 7 wherein the battery unit powers the second switch control unit.

14. The apparatus according to claim 13 wherein the battery unit powers the second switch control unit through the power switch.

* * * * *